(12) United States Patent
Widzgowski et al.

(10) Patent No.: US 9,042,010 B2
(45) Date of Patent: May 26, 2015

(54) SCANNING MICROSCOPE AND METHOD FOR OPTICALLY SCANNING ONE OR MORE SAMPLES

(75) Inventors: Bernd Widzgowski, Dossenheim (DE); Holger Birk, Meckesheim (DE); Volker Seyfried, Nussloch (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 290 days.

(21) Appl. No.: 13/578,607

(22) PCT Filed: Feb. 11, 2011

(86) PCT No.: PCT/EP2011/052028
§ 371 (c)(1),
(2), (4) Date: Sep. 21, 2012

(87) PCT Pub. No.: WO2011/098555
PCT Pub. Date: Aug. 18, 2011

(65) Prior Publication Data
US 2013/0003172 A1     Jan. 3, 2013

(30) Foreign Application Priority Data
Feb. 12, 2010  (DE) .................. 10 2010 007 727

(51) Int. Cl.
G02B 21/08   (2006.01)
G02B 21/00   (2006.01)

(52) U.S. Cl.
CPC .................. *G02B 21/0036* (2013.01)

(58) Field of Classification Search
USPC ................................. 359/385, 390
See application file for complete search history.

(56) References Cited

U.S. PATENT DOCUMENTS

| | | | |
|---|---|---|---|
| 4,863,252 A | 9/1989 | McCarthy et al. | |
| 2002/0139936 A1 | 10/2002 | Dumas | |
| 2003/0063379 A1 | 4/2003 | Fukuyama et al. | |
| 2006/0007534 A1 | 1/2006 | Fukuyama et al. | |

FOREIGN PATENT DOCUMENTS

| | | |
|---|---|---|
| DE | 100 33 549 | 1/2002 |
| DE | 101 52 609 | 5/2003 |
| DE | 102 09 322 | 9/2003 |
| DE | 10 2004 042 913 | 3/2006 |
| EP | 0 330 008 | 8/1989 |
| EP | 1 283 416 | 2/2003 |
| JP | 5-127089 A | 5/1993 |
| JP | 7-325262 A | 12/1995 |
| JP | 2006-30304 A | 2/2006 |
| WO | 2009/129802 | 10/2009 |

*Primary Examiner* — Frank Font
(74) *Attorney, Agent, or Firm* — Hodgson Russ, LLP

(57) ABSTRACT

A device in the form of a scanning microscope, a device in the form of a structural unit for a microscope and a method and a device for optically scanning one or more samples. A device in the form of a scanning microscope has a light source (42), which emits an illuminating light beam (32). A focusing lens system (34) focuses the illuminating light beam (32) on a region to be examined of a sample (36). An actuator arrangement moves the focusing lens system (34) according to a prescribed scanning pattern transversely in relation to a center axis of the illuminating light beam (32) and/or in relation to a housing of a structural unit (20) that encloses the focusing lens system (34).

13 Claims, 7 Drawing Sheets

SCANNING MICROSCOPE AND METHOD FOR OPTICALLY SCANNING ONE OR MORE SAMPLES

CROSS-REFERENCE TO RELATED APPLICATIONS

The present application is the U.S. national phase of International Application No. PCT/EP2011/052028 filed Feb. 11, 2011, which claims priority of German Application No. 10 2010 007 727.5 filed Feb. 12, 2010, the entirety of which is incorporated herein by reference.

FIELD OF THE INVENTION

The invention relates to a device in the form of a scanning microscope. The device in the form of a scanning microscope comprises a light source which emits an illuminating light beam. A focusing lens system focuses the illuminating light beam on a region of a sample that is to be examined. Moreover, the invention relates to a device in the form of a structural unit for a microscope and a method and a device for optically scanning one or more samples.

BACKGROUND OF THE INVENTION

When optically scanning the sample with the scanning microscope, at a given moment only a selected point or line region of the sample is optically scanned. For this purpose a focusing lens system of the microscope focuses an illuminating light beam of the microscope on the selected region of the sample and detects the proportion of light that is sent back from the selected region, for example as a result of fluorescence effects in the sample. The image data obtained are stored. Then, other point or line-shaped regions are investigated which are preferably adjacent to one another and form, for example, a line or an area. In this way a large area of the sample can be optically scanned point-by-point and line-by-line. The data of the individual points are then compiled by means of a data processing apparatus to give an overall picture of the region of the sample that has been examined.

In order to guide the illuminating light beam onto the individual selected regions, it is known to direct the illuminating light beam in the microscope through a scanning device having a plurality of reflectors. The reflectors are each coupled to one or more actuators. Triggering the actuators causes the reflectors to be adjusted, thereby deflecting the illuminating light beam. After passing through the focusing lens system the deflected illuminating light beam hits the correspondingly selected regions of the sample.

Scanning microscopes of this kind are widely known and are basically very expensive because of their complicated construction. The image quality is crucially determined by the quality of the lens system of the microscope. This must have good imaging properties, for example colour correction, for all the scan angles that occur.

A device for deflecting a light beam and a scanning microscope are known from DE 102 09 322 A1. The device for deflecting the light beam has a unit that is rotatably about a first axis, comprising two reflective surfaces which are fixed relative to one another and receives a light beam and transmits it to a third reflective surface which is rotatable about a second axis extending perpendicularly to the first rotational axis. The rotatable unit has a further reflective surface which is fixed relative to the first and second reflective surfaces, the first and further reflective surfaces being arranged perpendicular to the second reflective surface.

From DE 100 33 549 A1 an optical arrangement for deflecting a light beam in two directions substantially perpendicular to one another is known. The arrangement has two reflectors which are each rotatable by means of a rotary drive about axes that are perpendicular to one another. An additional reflector in a prescribed angular position is non-rotationally associated with one of the reflectors.

DE 10 2004 042 913 A1 describes a device for scanning an object in which a carriage drive moves an objective lens in synchronism with an object support. During the movement of the object support optical scanning takes place.

It is known from DE 101 52 609 A1 to move an objective of a scanning microscope transversely with respect to the optical axis. There is no movement transversely with respect to the direction of an illuminating light beam providing direct illumination.

In the known confocal microscopes, a plurality of lenses and complicated objectives are used. An illuminating light beam is scanned over the sample by means of reflectors coupled to galvanometrically operating control elements. Alternatively, the lens-free optical near-field microscopy is also known. In this, an extremely sharp point is needed which is guided over the sample at a sub-wavelength distance and provides information only regarding the surface.

SUMMARY OF THE INVENTION

The aim of the present invention is to provide a device in the form of a scanning microscope, a structural unit for a microscope and a method for optically scanning a sample which allow favourable optical scanning of a sample by a simple means.

The objective is achieved by the features of the invention described herein. Advantageous embodiments are recited in the present specification.

According to a first aspect the invention relates to a device in the form of a scanning microscope having a light source that emits an illuminating light beam, a focusing lens system that focuses the illuminating light beam on an area of a sample that is to be examined, and an actuator arrangement that moves the focusing lens system according to a given scanning pattern transversely in relation to a center axis of the illuminating light beam.

The device according to the invention is an optical imaging device. In particular, optical features of individual points of the samples are captured and stored in the form of image data and built up into an overall image. The focusing lens system preferably corresponds to the lens system that intentionally influences the illuminating light beam finally before it meets the sample, and in particular focuses it on the part of the sample that is currently to be examined. The movement of the focusing lens system transversely to the center axis of the illuminating light beam and hence optionally relative to a housing that surrounds the focusing lens system allows particularly inexpensive structural elements to be used. Moreover, the moving parts, particularly a lens of the focusing lens system, can be of relatively lightweight construction, compared with conventional scanning reflectors, and thanks to their lower inertia can be moved quickly, easily and precisely. This contributes to favourable optical scanning of the sample. Preferably, the focusing lens system encompasses at least one lens.

The center axis of the illuminating light beam, in this context and hereinafter, is the center axis of the illuminating light beam in a reference position of the center axis of the illuminating light beam. For example, the focusing lens system may be moved together with an optical element, for example an optical fibre, which directs the illuminating light beam onto the focusing lens system. Then the center axis of the illuminating light beam moves together with the focusing lens system and the focusing lens system moves transversely relative to the center axis of the illuminating light beam in the reference position of the illuminating light beam. The center axis of the illuminating light beam is, in particular, in its reference position when the actuator arrangement is inactive.

There is no need for conventional components such as objectives, tube or scanning lenses which are highly complicated because of the demands made of field optics. Furthermore, very good values can be achieved with regard to the image field (for example>1 mm$^2$), operating distance (for example>1 mm) and numerical aperture (for example>0.7 in air).

According to a second aspect of the invention, the invention relates to a device in the form of a structural unit for a microscope. It comprises a housing, a focusing lens system and an actuator arrangement. The focusing lens system is arranged in the housing and focuses the illuminating light beam onto the region of the sample that is to be examined. The actuator arrangement moves the focusing lens system relative to the housing, particularly in accordance with a given scanning pattern.

If the illuminating light beam is in a fixed position relative to the housing, the actuator arrangement moves the focusing lens system transversely with respect to the center axis of the illuminating light beam as well. The structural unit can thus be part of the scanning microscope. Alternatively, the structural unit may also be used as an objective insert for a simple microscope which initially has no scanning function. In this way a conventional microscope without a scanning function can be converted into a scanning microscope. Moreover, the structural unit may for example be used individually with a stand or mounted on a plotter-like device for optically scanning the sample and coupled, for example, to an evaluating device by means of an optical fibre. The stand can then be moved by hand, or the structural unit can be moved at will in a plane by means of the device for optically scanning the sample, so that a number of samples can be scanned one after the other by moving the entire structural unit. Alternatively, a plurality of structural units may be mounted on the device. This allows particularly rapid processing of a plurality of samples.

In an advantageous embodiment, at least one of the devices comprises a collimating lens system. The collimating system collimates the illuminating light beam. The actuator arrangement then moves the focusing lens system in accordance with the prescribed scanning pattern transversely with respect to the center axis of the collimated illuminating light beam. In particular, the collimated illuminating light beam strikes the focusing lens system. The collimation of the illuminating light beam simply contributes to a particularly precise optical scanning of the sample as all the beams strikes the focusing lens system uniformly and as a result scanning errors are kept to a minimum.

In this context it is particularly advantageous if a projection of the collimated illuminating light beam completely overlaps an optical area of the focusing lens system, particularly at different positions of the focusing lens system which are occupied by the focusing lens system according to the prescribed scanning pattern. Thus the focusing lens system is preferably fully illuminated at all times by the collimated illuminating light beam. This helps to prevent edge effects which would occur if there were only partial illumination of the focusing lens system.

In an advantageous embodiment the device in the form of a scanning microscope or in the form of a structural unit comprises a carrier member by means of which the focusing lens system is coupled to the actuator arrangement. The carrier member may serve as a holder for the focusing lens system or may carry the holder for the focusing lens system. Preferably, the carrier member comprises a shutter which shuts out a proportion of the illuminating light beam. Furthermore, a front glass is preferably arranged between the focusing lens system and the sample, which is arranged to be fixed relative to the movable focusing lens system. In other words the actuator arrangement moves the focusing lens system relative to the front glass. Additionally, an opaque partition may be provided which protects the illuminating light beam and/or the focusing lens system from disruptive ambient light.

According to a third aspect the invention relates to a device for optically scanning one, preferably several samples. The device encompasses the structural unit and a base member which has a sample surface for receiving the one or more samples. The sample surface may, for example, be part of an object bench. The structural unit is arranged to be movable at least in a plane parallel to the sample surface.

For example, a rail system is arranged at least on one side of the sample surface. A running rail is movably mounted in the rail system. The running rail can be moved over the samples by means of the rail system. The running rail is preferably aligned perpendicularly to the rail system. Moreover, the structural unit is mounted in the running rail so as to be movable perpendicularly to the direction of movement of the running rail. In this way the device enables the structural unit as a whole to travel to any desired point above the sample surface. Thus a plurality of samples can be examined side by side, and then each individual sample can be scanned by means of the structural unit. The manner in which the structural unit is moved thus corresponds to the manner in which a pen is moved on a surface plotter. In addition, a plurality of structural units and possibly a plurality of running rails may be provided, so that a plurality of samples can be examined at the same time. As an alternative to the rail system the structural unit may also be moved relative to the samples by means of a bent arm.

According to a fourth aspect of the invention, the invention relates to a method for optically scanning the sample. The illuminating light beam is generated and is focused through a focusing lens system onto the area of the sample that is to be examined. The focusing lens system is moved by means of an actuator according to a prescribed scanning pattern perpendicularly to the illuminating light beam. Preferably the illuminating light beam is collimated and the collimated illuminating light beam preferably illuminates the entire optically active surface of the focusing lens system.

BRIEF DESCRIPTION OF THE DRAWING VIEWS

Embodiments of the invention by way of example are hereinafter described in more detail by means of schematic drawings, wherein.

Figure 3:
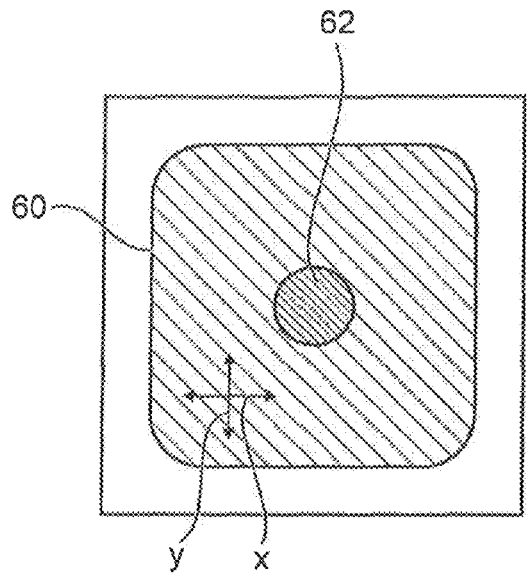
FIG. 3 shows a mask and a lens of the structural unit.
Figure 4:
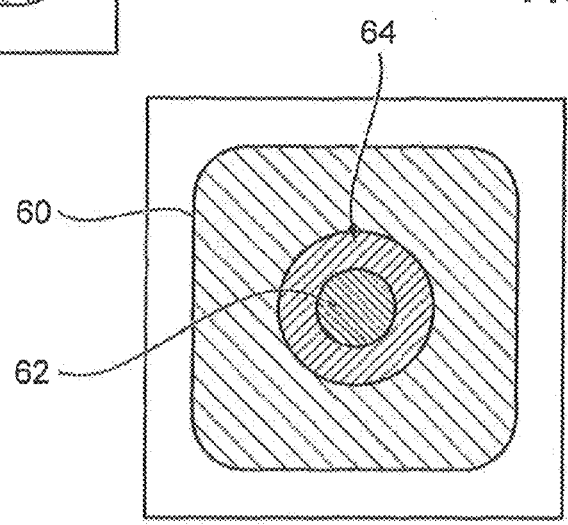
Figure 5:
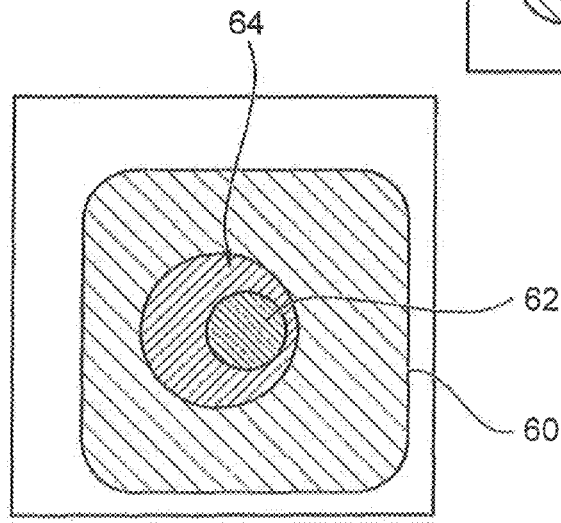
Figure 6:
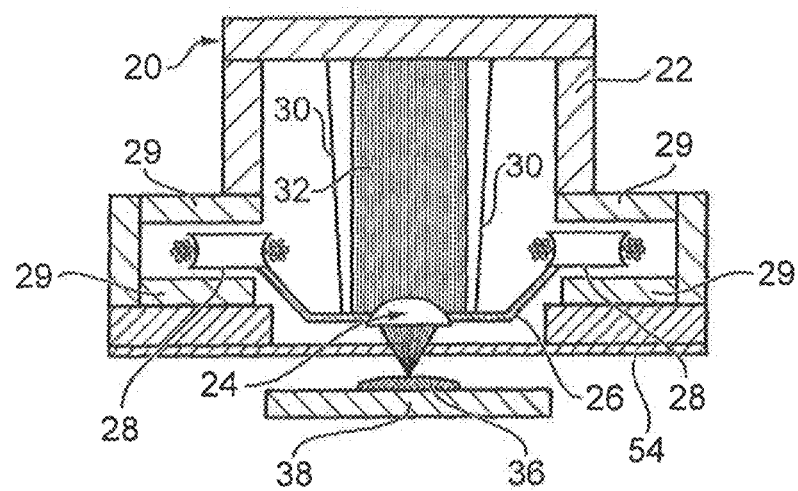
Figure 7:
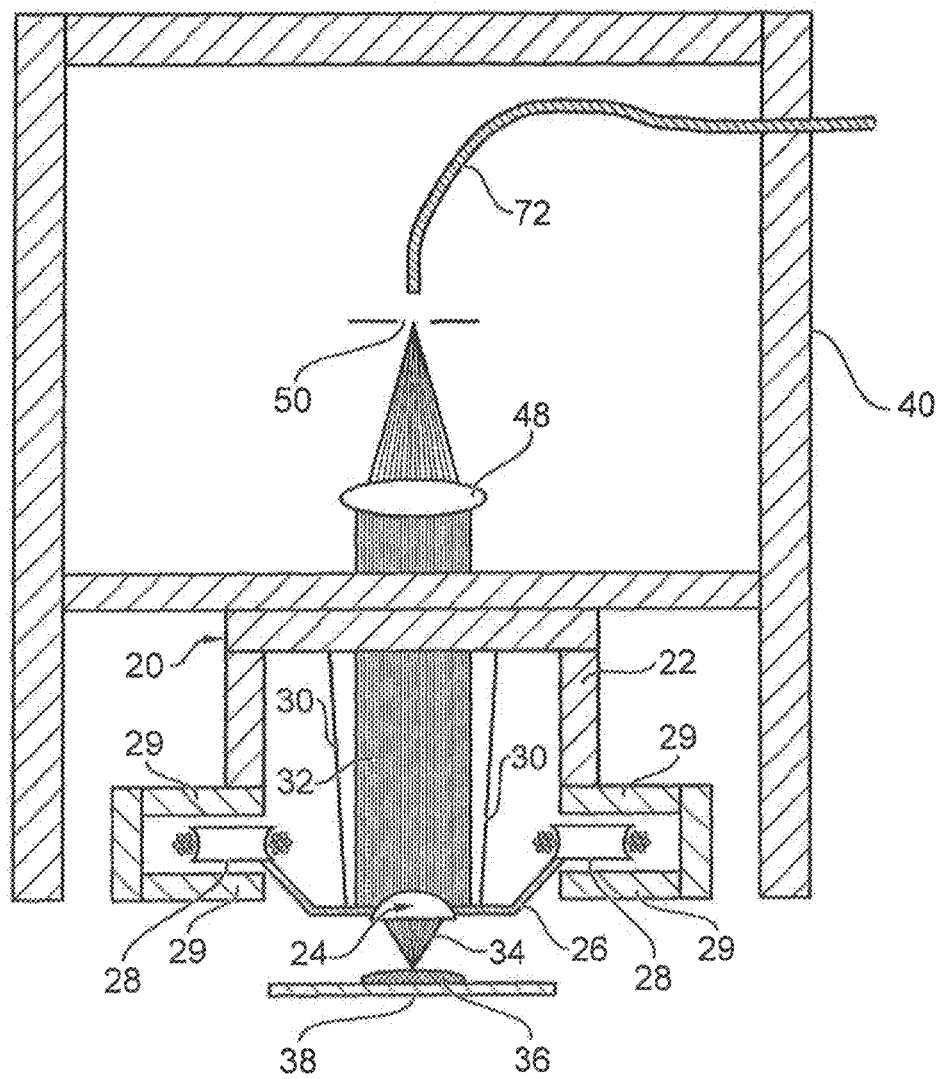
Figure 8:
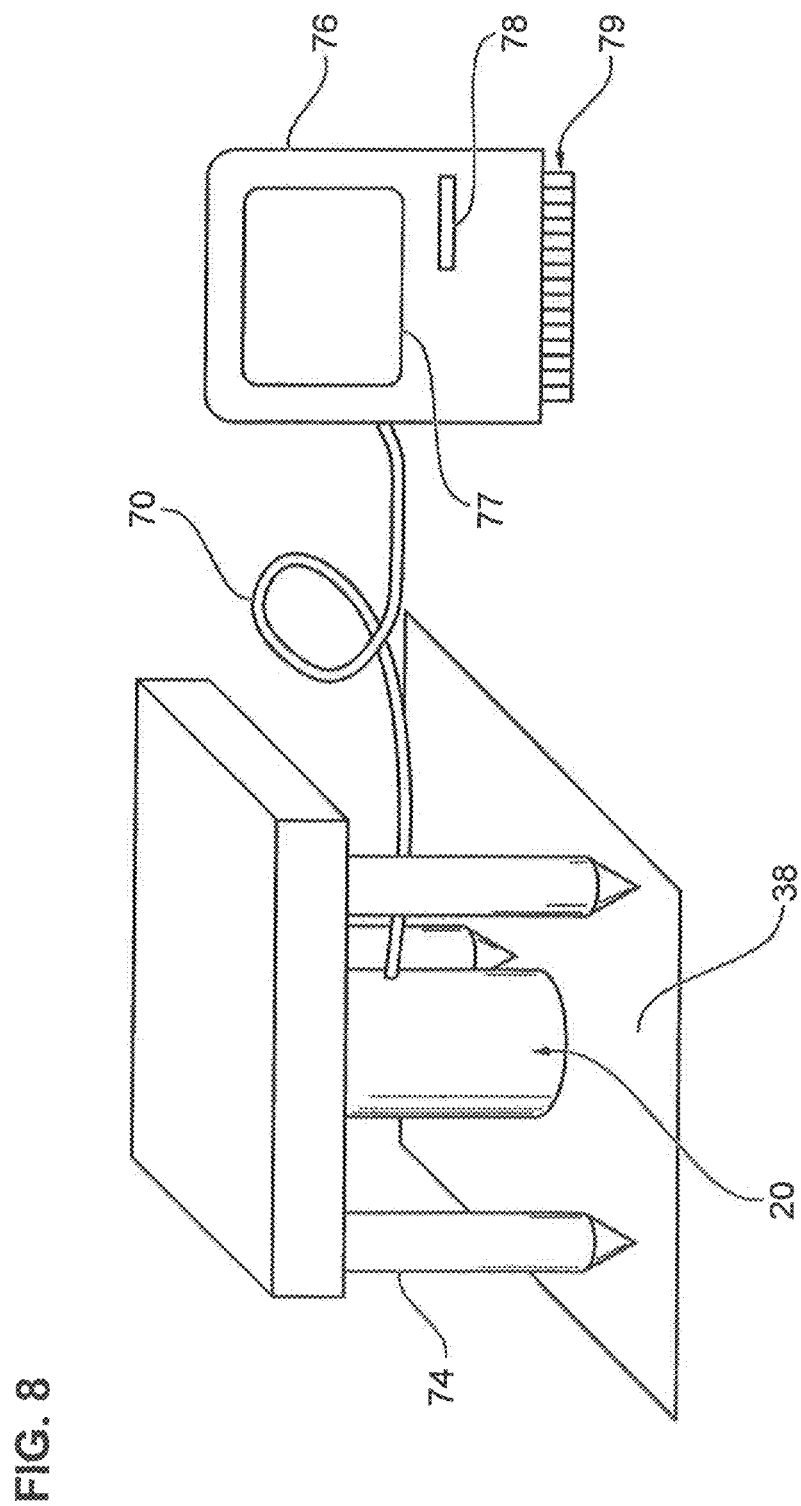
Figure 9:
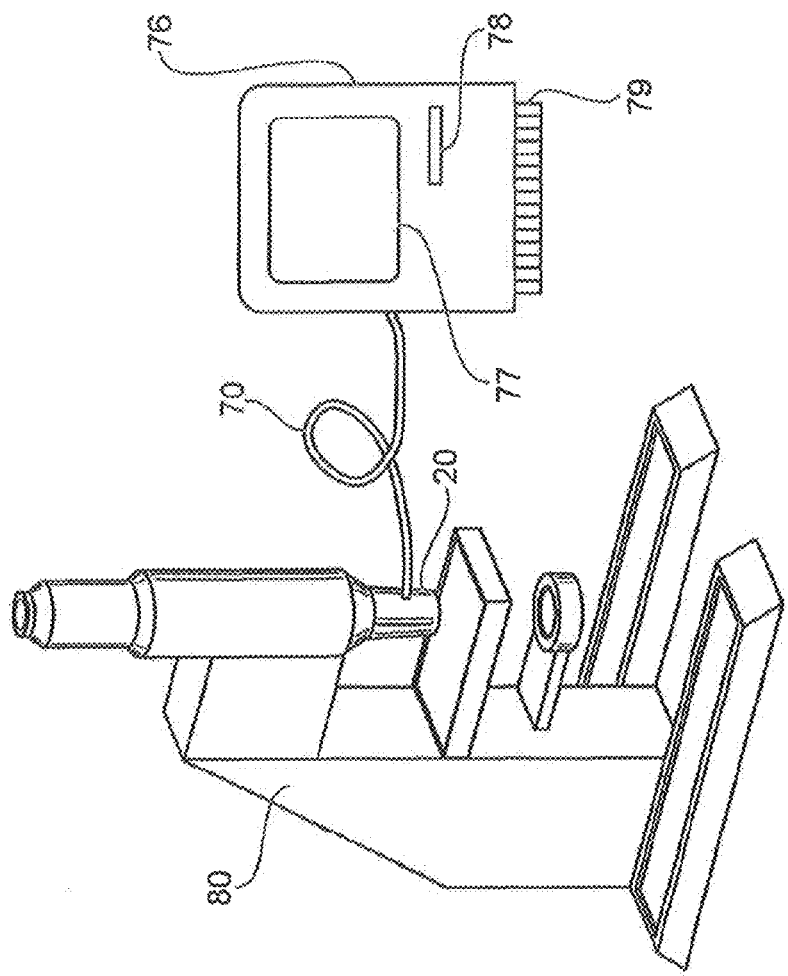
Figure 10:
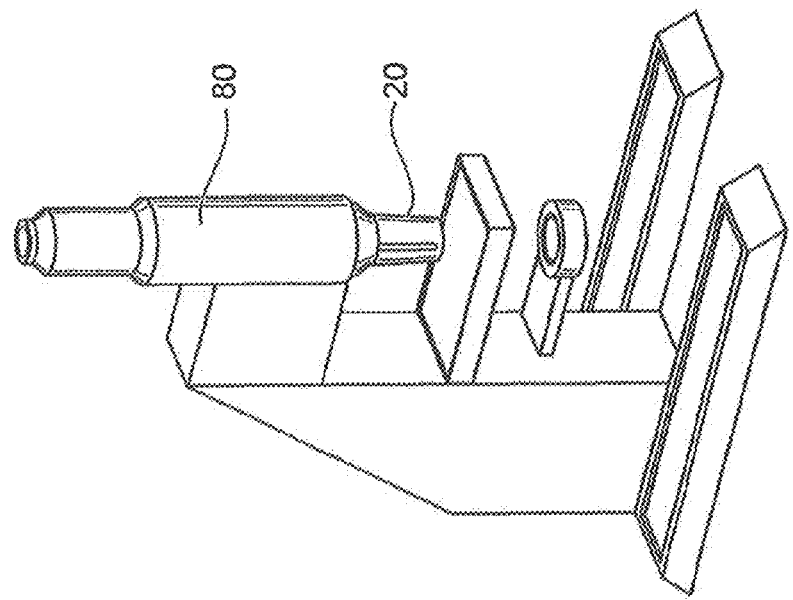
Figure 11:
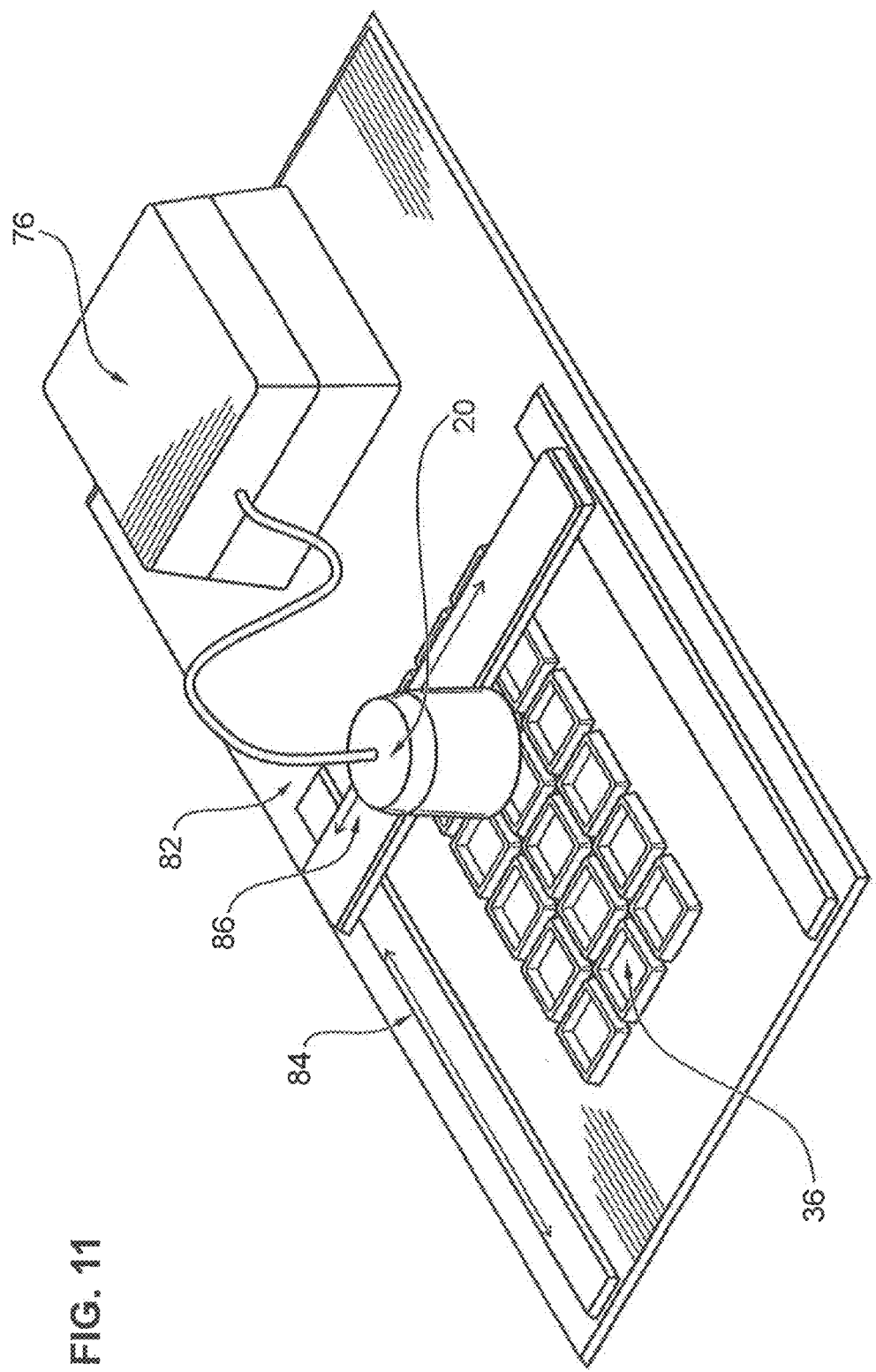
Figure 12:
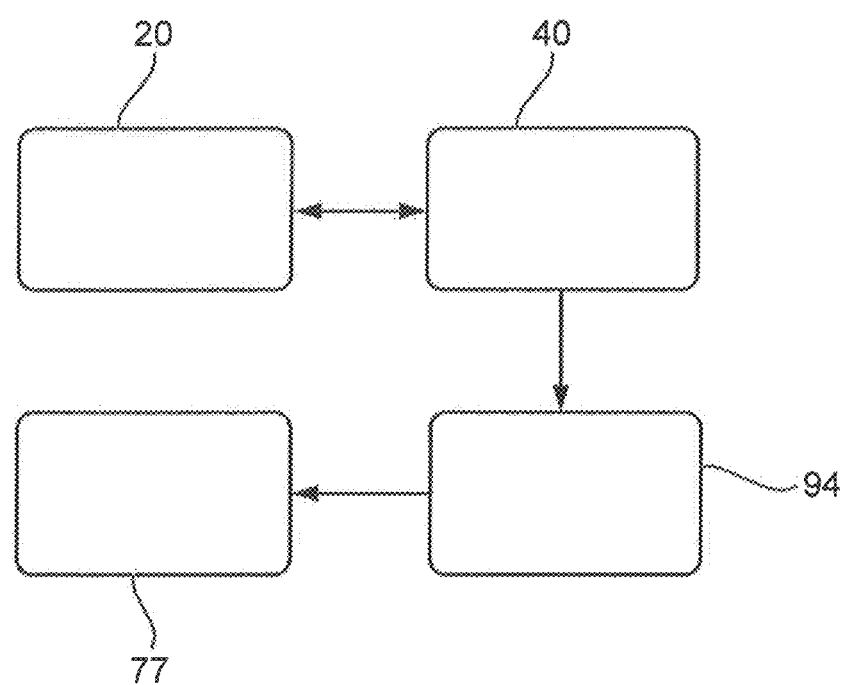

FIG. 4 shows the mask and the lens according to FIG. 3 with a projection of an illuminating light beam, FIG. 5 shows the mask and the lens according to FIG. 4 after movement of the lens according to a prescribed scanning pattern, FIG. 6 shows another embodiment of the structural unit, FIG. 7 shows another embodiment of the scanning microscope, FIG. 8 shows a stand with the structural unit, FIG. 9 shows a conventional microscope, FIG. 10 shows the microscope with the structural unit as an objective insert, FIG. 11 shows a device for optically scanning a sample, and FIG. 12 shows a block circuit diagram of a device for optically scanning a sample.

DETAILED DESCRIPTION OF THE INVENTION

Elements having the same construction or function have been given the same reference numerals from one figure to another.

Figure 1:
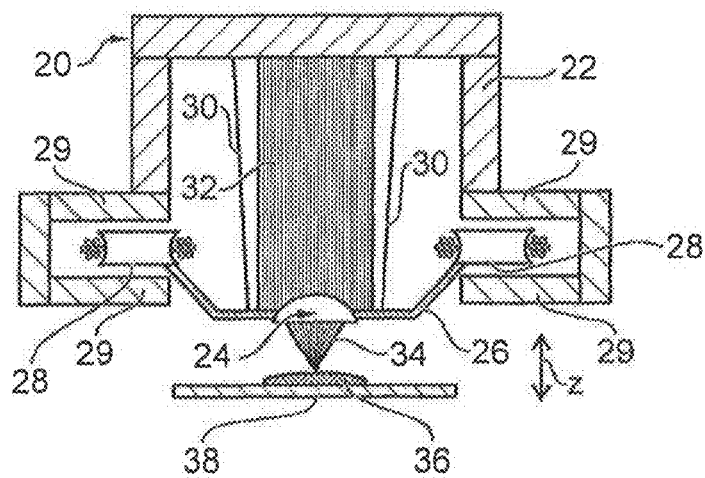
FIG. 1 shows a structural unit for a microscope.

FIG. 1 shows a device in the form of a structural unit 20, particularly a structural unit 20 for a microscope. The microscope may for example be a scanning microscope (FIG. 2) or a microscope 80 without a scanning function (FIG. 9). The structural unit 20 comprises a housing 22. Arranged in the housing 22 is a focusing lens system 24 which preferably comprises a lens 62 (FIG. 3) and is coupled via a carrier member 26 to an actuator arrangement. The carrier member 26 is preferably embodied as a mount for the lens 62 or carries the mount for the lens 62. The lens 62 may be constructed as an achromatic lens or as a lens doublet. The actuator arrangement preferably comprises electromagnetic adjusting elements, for example drive coils 28 which are fixedly coupled to the carrier member 26 and generate the first magnetic fields. Alternatively, the actuator arrangement may for example also comprise piezoelectric adjusting elements (for example with ultrasound), or mechanical or electrostatic positioning elements such as, for example, spindles, filaments in conjunction with galvanometrically operating adjusting elements and so on.

The drive coils 28 are arranged partially in or at least close to an external magnetic field which is preferably generated by permanent magnets 29 of the actuator arrangement. Depending on a flux in the drive coils 28 the drive coils 28 are pulled into the external magnetic field or repelled by it, causing movement of the focusing lens system 24. The external magnetic field may alternatively be generated by additional coils.

The carrier member 26 with the focusing lens system 24 is suspended in the housing 22 by means of at least one, preferably several retaining elements 30. The retaining elements 30 are formed for example by individual wires of spring steel or solid joints. The spring steel wires may be constructed so that they have a different spring constant in a first direction from that in a second direction, which is for example perpendicular to the first direction, when subjected to bending stress. This enables the focusing lens system to oscillate in the first direction in a resonance range without any resonance effects occurring in the second direction. Moreover, the spring wires may be used as current supply lines for the actuator arrangement. This is a saving of material, space in the housing and costs.

When the structural unit 20 is used in the intended manner an illuminating light beam 32 is directed onto the focusing lens system 24 through an opening (not shown) in the housing 22. Preferably, the illuminating light beam 32 is collimated. Moreover, the illuminating light beam 32 preferably covers the entire optical effective surface of the lens 62 of the focusing lens system 24, so that the entire aperture of the lens 62 is utilised for each scanning position.

The carrier member 26, in addition to its retaining function for the focusing lens system 24, acts as a mask and/or shutter, so that part of the illuminating light beam 32 is excluded by the carrier member 26 before it strikes the focusing lens system 24. The focusing lens system 24 focuses the illuminating light beam 32 into a focused illuminating light beam 34 on a sample 36. Sample 36 is located on a slide 38. Moreover, the carrier member 26 may advantageously be used as part of a position sensor. For example, a light source which illuminates a recess in the carrier member 26 may be provided on one side of the carrier member 26. Behind the recess, in the direction of illumination, is provided, for example, a light-sensitive sensor which is illuminated differently depending on the position of the carrier member 26 and is thus suitable for detecting the position of the carrier member 26 and hence of the focusing lens system 24. Alternatively, another position sensor may be provided which, for example, operates optically according to an encoder, electrically, capacitively or magnetically.

The focusing lens system 24 may be moved by corresponding operation of the actuators of the actuator arrangement in a plane perpendicular to the illuminating light beam 32, i.e. transversely with respect to the center axis of the illuminating light beam 32 and relative to the housing 22. The actuators are preferably embodied such that the focusing lens system 24 is moved perpendicularly to a direction z along which the illuminating light beam 32 extends. If the focusing lens system 24 is moved, the focused illuminating light beam 34 also moves and therefore so does the point on which the illuminating light beam 32 is focused. Alternatively, the illuminating light beam 32 may also be focused on a line, for example when a line scanner is used. By moving the focusing lens system 24, an entire area of the sample 36 that is to be examined is gradually scanned optically in this way. At the same time it is possible to linger for as long as desired over individual areas, for example in order to detect different optical effects. To some extent the sample reflects the illuminating light as detection light. Moreover, the sample emits fluorescent radiation which is detected alternatively or additionally to the reflected light. The data collected during the optical scanning is then compiled by means of a data processing device to form a complete image. The scanning movement may advantageously take place so as to resonate in one direction, by suitable operation of the actuators. This makes it possible to scan, for example, more than 500 lines in one second. The maximum travel of the movement is for example between 0.05 and 0.1 mm.

Microscopy methods in which the devices according to the invention can be used, or the effects to be observed with the structural unit 20 that occurred during such processes, include for example SRS (stimulated Raman scattering), FLIM (fluorescence lifetime imaging), SHG (second harmonic generation), FRAP (fluorescence recovery after photo-bleaching), FRET (fluorescence resonance energy transfer) and FCS (fluorescence correlation spectroscopy).

The focusing lens system 24 is preferably moved according to a prescribed scanning pattern. The prescribed scanning pattern is, for example, of a meandering configuration. Thus, for example, first of all a first scanning movement is performed in the x direction. Then, after a slight shift of the focusing lens system 24 in the y direction, the sample is scanned in the x direction again, in the opposite direction to the first scanning movement. This is repeated until the entire area of the sample 36 that is to be examined has been scanned.

In addition, the focusing lens system 24 may also be moved along the illuminating light beam 32, i.e. parallel to direction z. This makes it possible to scan a 3-dimensional area inside the sample 36 optically, particularly in a confocoal microscope.

Optionally, between the focusing lens system 24 and the sample 36, a front glass 54 is provided (FIG. 6) which protects the focusing lens system 24 from dust, dirt and other influences. This is particularly advantageous if an immersion medium is used between the sample 36 and the focusing lens system 24. Preferably the front glass 54 is microscopically rough in its construction, so that the immersion medium adheres well to it but the optical properties are adversely affected as little as possible. If the immersion medium is used and no front glass 54 is provided, the focusing lens system 24 has to be of correspondingly robust construction. Shear forces between the moving focusing lens system 24 and the immersion medium can be minimised by increasing an operating gap between the sample 36 and the focusing lens system 24. A diameter of the lens 62 should be adapted accordingly so as to achieve the same numerical aperture. The immersion medium preferably has a particularly low viscosity and it is even possible to use a deformable solid gel-like immersion medium. The refractive index of the immersion medium preferably corresponds to that of the lens 62 or that of the front glass 54.

Figure 2:
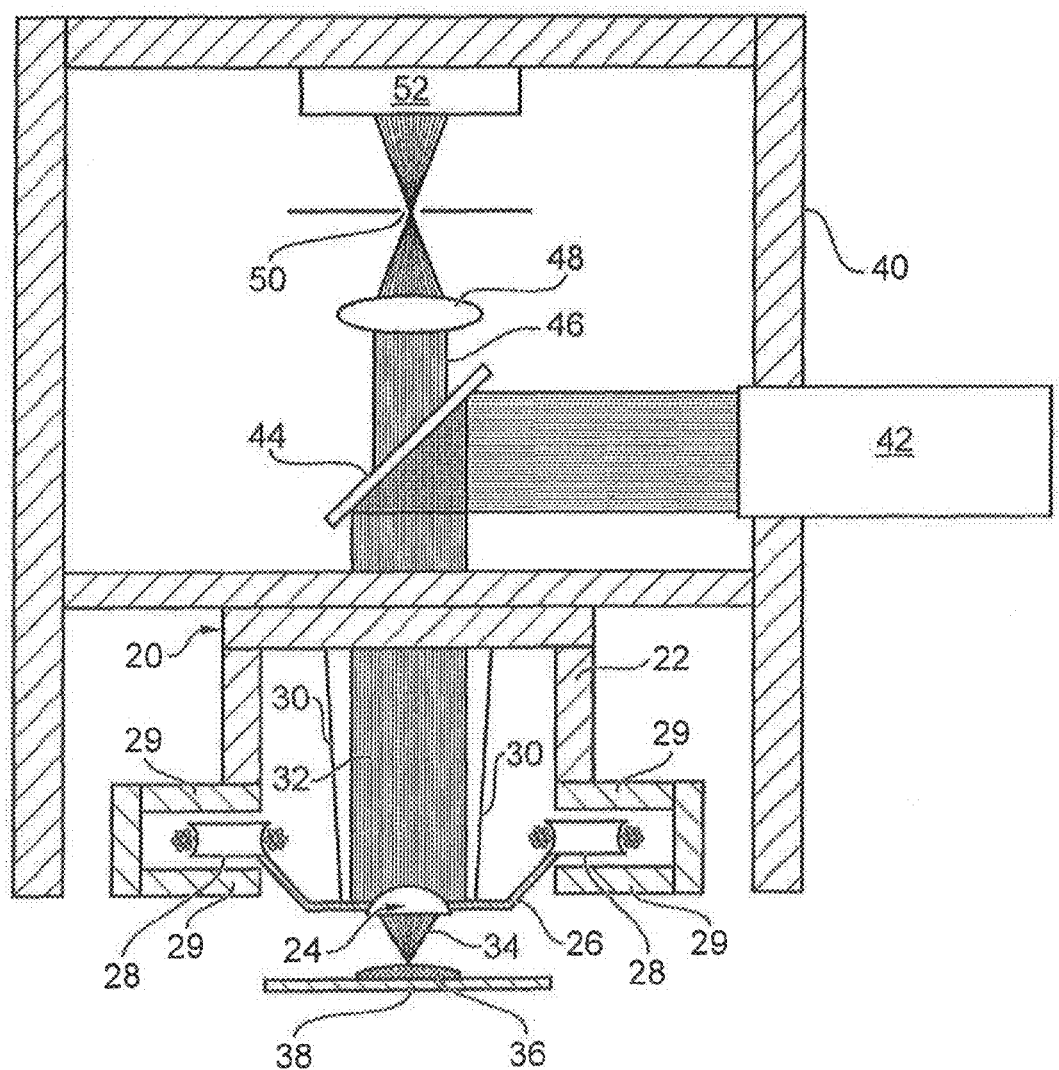
FIG. 2 shows a scanning microscope comprising the structural unit.

FIG. 2 shows a device in the form of a scanning microscope, particularly a scanning microscope. The scanning microscope comprises a light source 42, for example one or more lasers, and a housing 40 for the components of the scanning microscope. The light from the light source 42 is deflected through a beam splitter 44 to the structural unit 20. The beam splitter 44 is a dichroic mirror, for example. The light source 42 is, for example, a laser, particularly a laser diode. The light parties through an opening (not shown) in the housing 40 of the scanning microscope and through the opening in the housing 22 of the structural unit 20 and there strikes the focusing lens system 24. The light emanating from the sample 36 is basically shifted in wavelengths towards the illuminating light as a result of various known physical effects and travels in the opposite direction and parallel to the illuminating light beam 32 and passes through the beam splitter 44, particularly the dichroic mirror. A detection light beam 46 emanating from the sample can thus be separated, behind the beam splitter, from the illuminating light beam 32. The detection light beam 46 can be directed onto a detection lens 48 and by means of a detection shutter 50 onto a detector 52. The detection shutter may also be referred to as a detection pin hole. The detection shutter 50 may optionally also be made capable of being adjustable in size and/or movable. The detector 52 is then preferably coupled to the data processing equipment. Si diodes, APD arrays or PMTs, for example, are suitable as the detector 52.

Any of the light sources known for confocal microscopy may be used as the light source 42. In terms of a particularly compact construction laser diodes of various wavelengths are suitable. However, any other (laser) light sources may be used, preferably using a fibre coupling.

FIG. 3 shows a plan view of a lens 62 of the focusing lens system 24. The lens 62 is at least partly covered by a mask 60 which may be formed for example by the carrier member 26. FIG. 4 shows the mask 60 and the lens 62 during use of the structural unit in the intended manner, the lens 62 being totally covered by a projection 64 of the illuminating light beam 32. If the focusing lens system 24, particularly the lens 62 together with the mask 60, is then moved according to the prescribed scanning pattern transversely with respect to the center axis of the illuminating light beam 32, the mask 60 and the lens 62 move relative to the projection 64 of the illuminating light beam 32 (FIG. 5).

FIG. 7 shows an embodiment of the scanning microscope in which part of the lens system is replaced by an optical fibre 72. The optical fibre 72 serves to carry the illuminating light beam 32 and to receive the detection light beam 46. This embodiment makes it possible to keep the part of the scanning microscope that comprises the structural unit 20 particularly light-weight and flexible, for example as a handheld unit, as the rest of the scanning microscope can then be housed in another, possibly stationary housing. Alternatively or in addition, the detection light beam 46 can be carried through its own optical fibre to the detector 52. Moreover, the optical fibres may also serve as shutters, particularly as pinholes.

Alternatively, according to FIG. 8, the structural unit 20 may be used independently of the scanning microscope, for example in conjunction with a stand 74 which allows the structural unit 20 to be aligned in a stable manner above the sample 36. In this embodiment the stand 74 has three legs which may have points on their feet. The stand 74 may, however, also be of a different construction and may for example have more or fewer legs or different feet and/or be adjustable in height. The structural unit 20 may then be coupled, for example by means of a control line 70, to a control unit 76 which preferably comprises the data processing equipment, the light source 42 and/or the detector 52. The control line 70 then comprises a data line or at least one optical fibre for transmitting the data or for carrying the illuminating light and/or the detection light. Moreover, the control unit 76 comprises a display 77 on which the image of the sample 36 is shown, an input device 8 and preferably a connection 79 for other equipment. In addition, the control unit 76 may contain the laser 42, particularly a laser diode and/or the detector 52. Alternatively, the data evaluation may take place in the objective, for example through a miniaturised computing unit, especially an ASIC. The data can then be read off through the control line 70 and/or through a USB connector.

In a microscope 80 without a scanning function (FIG. 9) the structural unit 20 may simply be used as an objective insert. In this way any microscope without a scanning function can easily be converted into a scanning microscope. The cables required can be laid inside the microscope 80 or the structural unit 20 may be coupled to the control unit 76 and the microscope 80 (FIG. 10).

Alternatively, according to FIG. 11, the structural unit 20 may be mounted on a device for the optical scanning of one or more samples so that the entire structural unit 20 can be moved in a plane parallel to the sample surface. Such a device preferably encompasses the structural unit 20 and a base member 82 which has a sample surface for receiving one or more samples 36. For this, the sample surface may have depressions, indentations and/or stops. A rail system 84 is arranged at least on one side of the sample surface. A running rail 86 is aligned perpendicularly to the rail system and is mounted to be movable in the rail system 84. The running rail 86 can be moved over the samples 36 by means of the rail system 84. Furthermore, the structural unit 20 is mounted to be movable in the running rail 86 perpendicularly to the direction of movement of the running rail 86. The device thus enables the entire structural unit 20 to be moved to any desired point above the sample surface. In this way, a number of samples 36 can be examined side by side, and each individual sample 36 can then be scanned by means of the structural unit 20. The manner in which the structural unit 20 is moved thus corresponds to the way in which a pen moves in an area plotter. Additionally, a number of structural units 20 and optionally a number of running rails 86 may be provided, so that a number of samples 36 can be examined at the same time. As alternative to the rail system 84, the structural unit 20 can also be moved over the samples 36 by means of an angled arm. Additionally, large samples can also be examined, for example by stitching.

FIG. 12 shows a block circuit diagram of the structural unit 20, the housing 40 of the components of the scanning microscope, an image generating unit 94 and the display 77. The structural unit 20 in this embodiment comprises at least the focusing lens system 24, the carrier member 26 and the actuator arrangement for moving the carrier member 26. The components of the scanning microscope are, for example, the light source 42 and the detector 52. The image data of the individual image points picked up by the detector 52 are sent to the image generating unit 94 and compiled there to form an overall image which is then shown on the display 77.

The invention is not limited to the embodiments described. For example, the different embodiments may be combined with one another. In addition, the structural unit 20 may be used with the movable focusing lens system 24 for any desired microscopes. The illuminating light beam 32 may for example be coupled into the structural unit 20 through an optical fibre. The end of the fibre can then optionally be used as an excitation and detection pinhole. Furthermore, the end of the optical fibre may be moved together with the focusing lens system 24. This movement and particularly the movement of the focusing lens 24 then does not take place relative to the center axis of the illuminating light beam 32, as this moves with the optical fibre and the focusing lens system 24, but relative to the housing 22 of the structural unit 20. In other words, a reference position of the illuminating light beam 32 can be defined, e.g. the position of the illuminating light beam 32, when the actuators are not in operation, and the focusing lens system 24 is then moved transversely to the center axis of the illuminating light beam 32 in its reference position. The structural unit 20 may also be used as an objective of an objective revolver with otherwise conventional objectives. In particular, two structural units 20 may also be used as objectives for the objective revolver, in which case one without any immersion medium can be used as a "fast" objective and one with immersion medium, particularly with an internal and/or external immersion medium which may be arranged inside the structural unit 20 or outside the structural unit 20, can be used as a "high-resolution" objective. Also, the structural unit 20 can be used as a confocal module on a camera port (C mount) or as a handheld unit. The microscope may have an autofocus function. In another alternative embodiment the detector 52 and/or the light source 42 may also be moved with the lens. Here, again, the movement of the focusing lens system 24 is not relative to the center axis of the illuminating light beam 34 but relative to the housing 22 of the structural unit 20. Moreover, the structural unit 20 is also suitable for use in a non-confocally operating microscope which may then have corresponding detectors suitable for this operation. Alternatively or additionally, a lens of the focusing lens system 24 may be of concave construction, thereby increasing the size of the numerical aperture of the focusing lens system 24, contributing to a higher resolution of the microscope.

LIST OF REFERENCE NUMERALS 20 structural unit
22 housing for structural unit
24 focusing lens system
26 carrier member
28 drive coils
29 permanent magnets
30 retaining elements
32 illuminating light beam
34 focused illuminating light beam
36 sample
38 sample carrier
40 housing for components of scan microscope
42 light source
44 beam splitter
46 detection light beam
48 detection lens
50 detection shutter
52 detector
54 front glass
60 mask
62 lens
64 projection of illuminating light beam
70 control line
72 optical fibre
74 stand
76 control unit
77 display
78 input unit
79 connection
80 microscope
82 base member
84 rail system
86 running rail
94 image generating unit

The invention claimed is:

1. A structural unit for a microscope, the structural unit comprising:
   a housing (22);
   a focusing lens system (24) arranged in the housing (22), wherein the focusing lens system (24) focuses an illuminating light beam (32) of the microscope onto an area of a sample (36) to be examined; and
   an actuator arrangement which moves the focusing lens system (24) relative to the housing (22);
   wherein the structural unit is adapted to be used as an objective insert for a microscope without a scanning function to convert the microscope without a scanning function into a scanning microscope.

2. The structural unit according to claim 1, wherein the focusing lens system (24) is movably coupled to the housing (22) by at least one retaining element (30).

3. The structural unit according to claim 1, further comprising a collimation lens system which collimates the illuminating light beam (32).

4. The structural unit according to claim 3, wherein the actuator arrangement moves the focusing lens system (24) transversely with respect to a center axis of the collimated illuminating light beam (32) according to a prescribed scanning pattern.

5. The structural unit according to claim 1, wherein the actuator arrangement moves the focusing lens system (24) transversely in a first spatial direction (x) and in a second spatial direction (y) with respect to the center axis of the illuminating light beam (32).

6. The structural unit according to claim 5, wherein the actuator arrangement moves the focusing lens system (24) in a third spatial direction (z) along the center axis of the illuminating light beam (32).

7. The structural unit according to claim 3, wherein a projection of the collimated illuminating light beam (32) totally overlaps an optically active area of the focusing lens system (24).

8. The structural unit according to claim 7, wherein a projection of the collimated illuminating light beam (32) fully overlaps the optically active area of the focusing lens system (24) at different positions of the focusing lens system (24) when the focusing lens system (24) is moved according to the prescribed scanning pattern.

9. The structural unit according to claim 1, wherein the focusing lens system (24) is coupled to the actuator arrangement via a carrier member (26), and wherein the carrier member (26) comprises a shutter which shuts out part of the illuminating light beam (32).

10. The structural unit according to claim 9, wherein the focusing lens system (24) or the carrier member (26) is movably coupled to the housing (22) by means of at least one retaining element (30).

11. The structural unit according to claim 1, further comprising a front glass (54) arranged between the focusing lens system (24) and the sample (36), wherein the focusing lens system (24) moves relative to the front glass (54).

12. The structural unit according to claim 1, further comprising an opaque partition arranged to protect at least one of the illuminating light beam (32) and the focusing lens system (24) from ambient light.

13. A method of converting a microscope without a scanning function into a scanning microscope, the method comprising the steps of:
provided a structural unit comprising (i) a housing (22), (ii) a focusing lens system (24) arranged in the housing (22), wherein the focusing lens system (24) focuses an illuminating light beam (32) of the microscope onto an area of a sample (36) to be examined, and (iii) an actuator arrangement which moves the focusing lens system (24) relative to the housing (22); and
installing the structural unit as an objective insert onto the microscope, whereby the microscope is converted into a scanning microscope.

* * * * *